(12) United States Patent
Takao et al.

(10) Patent No.: US 12,524,592 B2
(45) Date of Patent: Jan. 13, 2026

(54) VERIFICATION PROCESSING DEVICE, VERIFICATION METHOD, AND PROGRAM

(71) Applicant: MITSUBISHI HEAVY INDUSTRIES, LTD., Tokyo (JP)

(72) Inventors: Kenji Takao, Tokyo (JP); Keita Hirayama, Tokyo (JP); Kenta Masumori, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1027 days.

(21) Appl. No.: 17/629,650

(22) PCT Filed: Jul. 10, 2020

(86) PCT No.: PCT/JP2020/027017
§ 371 (c)(1),
(2) Date: Jan. 24, 2022

(87) PCT Pub. No.: WO2021/020077
PCT Pub. Date: Feb. 4, 2021

(65) Prior Publication Data
US 2022/0253582 A1     Aug. 11, 2022

(30) Foreign Application Priority Data

Jul. 30, 2019   (JP) ................................ 2019-140118

(51) Int. Cl.
*G06F 30/3323*     (2020.01)
*G06F 11/3604*     (2025.01)
(Continued)

(52) U.S. Cl.
CPC ...... *G06F 30/3323* (2020.01); *G06F 11/3608* (2013.01); *G06F 30/20* (2020.01);
(Continued)

(58) Field of Classification Search
CPC ............... G06F 30/3323; G06F 30/367; G06F 30/3308; G06F 30/398; G06F 30/20; G06F 11/3608; G06F 2119/02
(Continued)

(56) References Cited

U.S. PATENT DOCUMENTS 5,513,339 A  *  4/1996  Agrawal ............... G06F 11/261
                                                  714/E11.167
7,788,610 B2 *  8/2010  Emek ...................... G06F 30/33
                                                  716/111
(Continued)

FOREIGN PATENT DOCUMENTS

JP      2008-071135 A       3/2008
JP      2010128513 A  *     6/2010
(Continued)

OTHER PUBLICATIONS

WIPO_English_Machine_Tranlsaiton of Japanase Patent Document No. JP-2008071135, published on Mar. 27, 2008, machine translated by WIPO Translate on Sep. 5, 2025, 29 pages. (Year: 2025).*
(Continued)

*Primary Examiner* — Phallaka Kik
(74) *Attorney, Agent, or Firm* — HAUPTMAN HAM, LLP

(57) ABSTRACT

A verification processing device includes: an inspection processing unit which extracts elements of which states change in a process leading to an insecure event by means of a model inspection for a model to be inspected; a refinement processing unit which determines, for each of the extracted elements, whether the element contributes to the occurrence of the insecure event and refines a cause element which is an element of a cause of the insecure event; and a receiving unit which receives, from an operator, a selection of at least one cause element from among a plurality of the cause elements, wherein the inspection processing unit per-
(Continued)

forms the model inspection once again on an improved model to be inspected which is a new model to be inspected in which a prescribed measure is executed for the selected cause element.

14 Claims, 11 Drawing Sheets

(51) Int. Cl.
*G06F 30/20* (2020.01)
*G06F 30/3308* (2020.01)
*G06F 30/367* (2020.01)
*G06F 30/398* (2020.01)
*G06F 119/02* (2020.01)

(52) U.S. Cl.
CPC ........ *G06F 30/3308* (2020.01); *G06F 30/367* (2020.01); *G06F 30/398* (2020.01); *G06F 2119/02* (2020.01)

(58) Field of Classification Search
USPC ............... 716/106, 111, 136; 703/14, 17, 20
See application file for complete search history.

(56) References Cited

U.S. PATENT DOCUMENTS

| | | | | |
|---|---|---|---|---|
| 9,626,284 | B2 * | 4/2017 | Xue | .................... G06F 11/3672 |
| 2008/0072195 | A1 | 3/2008 | Mukaiyama | |
| 2009/0193294 | A1 * | 7/2009 | Nakamura | .......... G06F 11/3612 |
| | | | | 714/E11.178 |
| 2013/0019309 | A1 * | 1/2013 | Strayer | .................... G06N 5/04 |
| | | | | 726/23 |
| 2013/0219222 | A1 * | 8/2013 | Xue | .................... G06F 11/3688 |
| | | | | 714/32 |
| 2015/0153413 | A1 * | 6/2015 | Hasse | .................. G01R 31/005 |
| | | | | 324/750.01 |
| 2015/0344050 | A1 | 12/2015 | Yanai et al. | |
| 2020/0218243 | A1 * | 7/2020 | Liu | ....................... G05B 19/052 |
| 2020/0233405 | A1 * | 7/2020 | Casilli | ..................... G06F 30/20 |
| 2020/0387656 | A1 | 12/2020 | Takao et al. | |

FOREIGN PATENT DOCUMENTS

| | | | | |
|---|---|---|---|---|
| JP | 2014-139052 | A | 7/2014 | |
| JP | 2020-071759 | A | 5/2020 | |
| WO | WO-2018088760 | A2 * | 5/2018 | ............. G01N 21/88 |
| WO | 2019142858 | A1 | 7/2019 | |

OTHER PUBLICATIONS

WIPO_English_Machine_Tranlsaiton of Japanase Patent Document No. JP-2014139052, published on May 13, 2016, machine translated by WIPO Translate on Sep. 5, 2025, 29 pages. (Year: 2025).*
PCT/ISA/210, "International Search Report for PCT International Application No. PCT/JP2020/027017," Aug. 11, 2020.
PCT/ISA/237, "Written Opinion for PCT International Application No. PCT/JP2020/027017," Aug. 11, 2020.

* cited by examiner

<DEFECT LIST>

| ELEMENT | NUMBER OF TRANSITION STEPS | | | | | | |
|---|---|---|---|---|---|---|---|
| | 0 (INITIAL) | 1 | 2 | 3 | 4 | 5 | 6 |
| X1 | FALSE | | | | TRUE | FALSE | |
| E1 | TRUE | | | | | | FALSE |
| E3 | TRUE | FALSE | | | | | |
| X5 | FALSE | | TRUE | FALSE | | TRUE | |
| E13 | FALSE | | TRUE | | | | |
| ⋮ | ⋮ | ⋮ | ⋮ | ⋮ | ⋮ | ⋮ | ⋮ |
| S1 | FALSE | | | | TRUE | | |
| ⋮ | ⋮ | ⋮ | ⋮ | ⋮ | ⋮ | ⋮ | ⋮ |
| T1 | FALSE | | TRUE | | | | |
| ⋮ | ⋮ | ⋮ | ⋮ | ⋮ | ⋮ | ⋮ | ⋮ |
| U1 | FALSE | | | | | | TRUE |
| ⋮ | ⋮ | ⋮ | ⋮ | ⋮ | ⋮ | ⋮ | ⋮ |

VERIFICATION PROCESSING DEVICE, VERIFICATION METHOD, AND PROGRAM

RELATED APPLICATIONS

The present application is National Phase of International Application No. PCT/JP2020/027017 filed Jul. 10, 2020, and claims priority from Japanese Application No. 2019-140118, filed Jul. 30, 2019, the disclosure of which is hereby incorporated by reference herein in its entirety.

TECHNICAL FIELD

The present disclosure relates to a verification processing device, a verification method, and a program.

BACKGROUND ART

Patent Literature 1 describes that a model inspection is utilized to comprehensively verify an operation logic of a data processing system.

CITATION LIST

Patent Literature

[Patent Literature 1]
Japanese Unexamined Patent Application, First Publication No. 2008-071135

SUMMARY OF INVENTION

Technical Problem

When a model inspection is utilized to verify an operation logic of a relay circuit, only verifying a basic operation logic of the relay circuit is insufficient and the verification of the operation logic including that a defect can occur in a signal line or a circuit element included in the relay circuit is required.

When the fact that defects in a signal line or a circuit element (for example, signal line accidental contact, disconnection, or circuit element failure) can occur multiple-simultaneously and asynchronously regardless of a basic operation logic of a relay circuit is taken into consideration, in a model inspection, comprehensively verifying all combinations of defects which can occur from each state during a basic operation, in addition to state transitions which can occur during the basic operation is necessary.

However, in such a case, even if a counterexample in which a combination of a plurality of defects which occur in each signal line and each circuit element included in the relay circuit is output, the combination of defects is likely to include non-critical) defects which do not necessarily contribute to leading to an insecure event.

That is to say, the model inspection comprehensively inspects state transitions (paths) in a state in which all states which a model to be inspected can take are expressed with a logical expression using a binary decision diagram (BDD) or the like and simply shows a user the fact that "there is a path leading to an insecure event" when even one path (counterexample) leading to an insecure event is found. Therefore, the path leading to an insecure event can also include state transitions which are not necessarily critical. For this reason, there is no choice but to make a counterexample interpretation for counterexamples which can also include non-critical defects in relation to insecure events, in which a burden required for counterexample interpretation work for the model inspection is large.

Also, it takes a lot of work time for the inspection because causing the model to be inspected to include a measure to be reflected and performing the model inspection once again on the model to be inspected need to be repeatedly performed until there is no counterexample on the basis of the result of counterexample interpretation. Furthermore, when a process of repeatedly performing the processing "counterexample interpretation→resetting (coding) of model to be inspected→model inspection" is performed through a human operation, there is a concern concerning human errors being inherent and comprehensiveness cannot be ensured.

An object of at least one embodiment of the present disclosure is to provide a verification processing device, a verification method, and a program capable of minimizing human error while shortening a working time.

Solution to Problem

A verification processing device according to an aspect of the present disclosure includes: an inspection processing unit which extracts elements of which states change in a process leading to an insecure event by means of a model inspection for a model to be inspected; a refinement processing unit which determines, for each of the extracted elements, whether the element contributes to the occurrence of the insecure event and refines a cause element which is an element of a cause of the insecure event; and a receiving unit which receives, from an operator, a selection of at least one cause element from among a plurality of the cause elements. The inspection processing unit performs the model inspection once again on an improved model to be inspected which is a new model to be inspected in which a prescribed measure is executed for the selected cause element.

A verification method according to an aspect of the present disclosure includes: a step of extracting elements of which states change in a process leading to an insecure event by means of a model inspection for a model to be inspected; a step of determining, for each of the extracted elements, whether the element contributes to the occurrence of the insecure event and refining a cause element which is an element of a cause of the insecure event; a step of receiving, from an operator, a selection of at least one cause element from among a plurality of the cause elements; and a step of performing the model inspection once again on an improved model to be inspected which is a new model to be inspected in which a prescribed measure is executed for the selected cause element.

A program according to an aspect of the present disclosure causes a computer of a verification processing device to execute: a step of extracting elements of which states change in a process leading to an insecure event by means of a model inspection for a model to be inspected; a step of determining, for each of the extracted elements, whether the element contributes to the occurrence of the insecure event and refining a cause element which is an element of a cause of the insecure event; a step of receiving, from an operator, a selection of at least one cause element from among a plurality of the cause elements; and a step of performing the model inspection once again on an improved model to be inspected which is a new model to be inspected in which a prescribed measure is executed for the selected cause element.

Advantageous Effects of Invention

According to each of the above aspect, it is possible to minimize a human error while shortening a working time.

DESCRIPTION OF EMBODIMENTS

First Embodiment

A verification processing device according to a first embodiment will be described below with reference to FIGS. 1 to 6.

(Constitution of Verification Processing Device)

Figure 1:
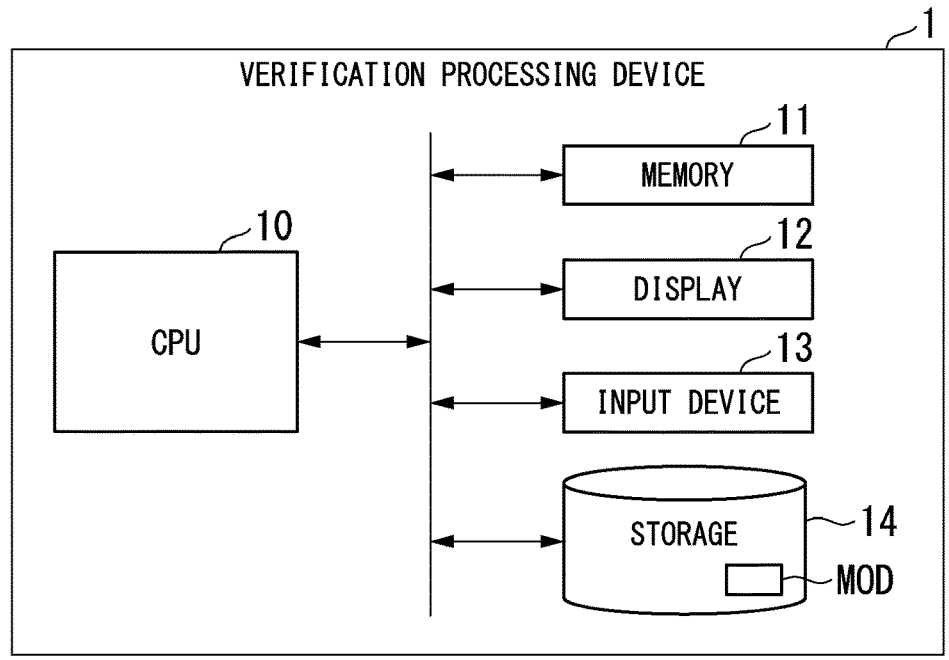
FIG. 1 is a diagram illustrating a constitution of a verification processing device according to a first embodiment.

FIG. 1 is a diagram illustrating a constitution of the verification processing device according to the first embodiment.

Figure 2:
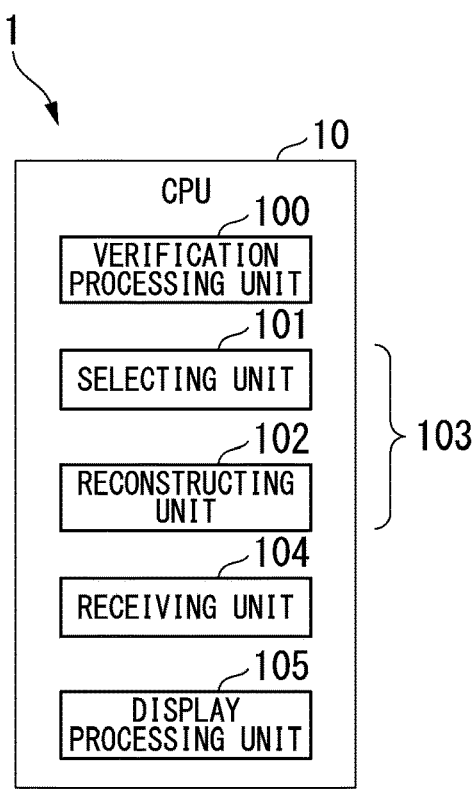
FIG. 2 is a diagram illustrating a functional constitution of a central processing unit (CPU) of the verification processing device according to the first embodiment.

FIG. 2 is a diagram illustrating a functional constitution of a central processing unit (CPU) of the verification processing device according to the first embodiment.

As shown in FIG. 1, a verification processing device 1 includes a CPU 10, a memory 11, a display 12, an input device 13, and a storage 14 and is constituted as a general computer.

The memory 11 is a so-called main storage device and has commands and data developed therein and is configured to be operated by the CPU 10 on the basis of a program.

The display 12 is a display device which visually displays information and examples thereof include liquid crystal displays, organic electro luminescence (EL) displays, and the like.

The input device 13 is an input device which receives a user's operation of the verification processing device 1 and examples thereof include general mice, keyboards, touch sensors, and the like.

The storage 14 is a so-called auxiliary storage device and examples thereof include hard disk drives (HDDs), solid state drives (SSDs), and the like. For example, a model to be inspected MOD indicating a relay circuit to be inspected is recorded in the storage 14.

The CPU 10 is a processor which controls the entire operation of the verification processing device 1. As shown in FIG. 2, the CPU 10 according to the embodiment functions as an inspection processing unit 100, a selecting unit 101, a refinement processing unit 103 (selecting unit 101 and reconstructing unit 102), a receiving unit 104, and a display processing unit 105.

The inspection processing unit 100 extracts elements of which states change in a process leading to an insecure event by performing a model inspection on the model to be inspected MOD.

The model inspection performed herein is to comprehensively inspect whether there is a combination (path) of state transitions leading to an insecure event by expressing all states in which a model to be inspected can be taken with a logical expression using a binary decision diagram (BDD) or the like. An algorithm for the model inspection to be performed in the embodiment may be generally well known.

The model to be inspected MOD is a program in which an operation logic of a system to be inspected (for example, a railway security system) is stipulated. In addition, in the model inspection, comprehensive operation verification of the system is performed in accordance with the operation logic stipulated herein.

Also, the insecure event is a state defined as a state in which the system to be inspected need not to transition under any circumstances. For example, in a railway security system, a "state in which an emergency brake does not work during automatic driving control of a vehicle," a "state in which a crossing barrier is not down even though a vehicle is traveling on a railroad crossing," and the like are defined as insecure events. A state defined as such an insecure event (state in which a vehicle is not to meet) is also called an "inspection expression." Generally, a plurality of types of insecure events (inspection expressions) are defined for one model and an operation verification using a model inspection is performed for each of the insecure events (inspection expressions).

When it is determined that a vehicle would reach a certain insecure event according to a result of comprehensive inspection, elements of which states change in the process (from FALSE to TRUE or from TRUE to FALSE) are extracted as elements which are likely to contribute to the occurrence of the insecure event. Here, the model inspection finds just one counterexample (a path leading to an insecure event) and simply proves the fact that "there is a path leading to an insecure event." Thus, all of the elements extracted herein are not elements (critical elements) which have contributed to the occurrence of insecure events. That is to say, some of the elements extracted using the model inspection include elements which happen to change in value and do not essentially contribute to the occurrence of insecure events.

The selecting unit 101 selects one element from among elements of which states change in a process leading to an insecure event on the basis of the result of the model inspection performed using the inspection processing unit 100. The "element" is a minimum unit which defines an operation logic and a state of the model to be inspected MOD and is, for example, a signal line or a circuit element installed in a relay circuit of a security system. As will be described later, the "element" also includes a virtual element defined to simulate an operation itself of the signal line or a circuit element installed in an actual relay circuit, as well as to simulate an operation of a relay circuit when a defect occurs.

The reconstructing unit 102 reconstructs the model to be inspected MOD in accordance with a prescribed condition in the process of the model inspection performed in the embodiment.

The selecting unit 101 and the reconstructing unit 102 described above function as the refinement processing unit 103 which determines, for each of the extracted elements as a result of model inspection, whether the element contributes to the occurrence of the insecure event and refines an element of the cause of the insecure event (hereinafter also referred to as a "cause element").

The receiving unit 104 receives, from an operator, a selection of at least one cause element from among a plurality of the cause elements specifically identified using the refinement processing unit 103.

In this case, the reconstructing unit 102 constructs a new model to be inspected which a prescribed measure is executed for the cause element selected by the operator (hereinafter also referred to as an "improved model to be inspected"). Moreover, the inspection processing unit 100 performs the model inspection once again on the improved model to be inspected.

The display processing unit 105 causes the display 12 to display the cause element selected by the operator and a history of the results of the model inspection performed once again using the inspection processing unit 100 and the refinement processing unit 103.

(Example of Model to Be Inspected)

Figure 3:
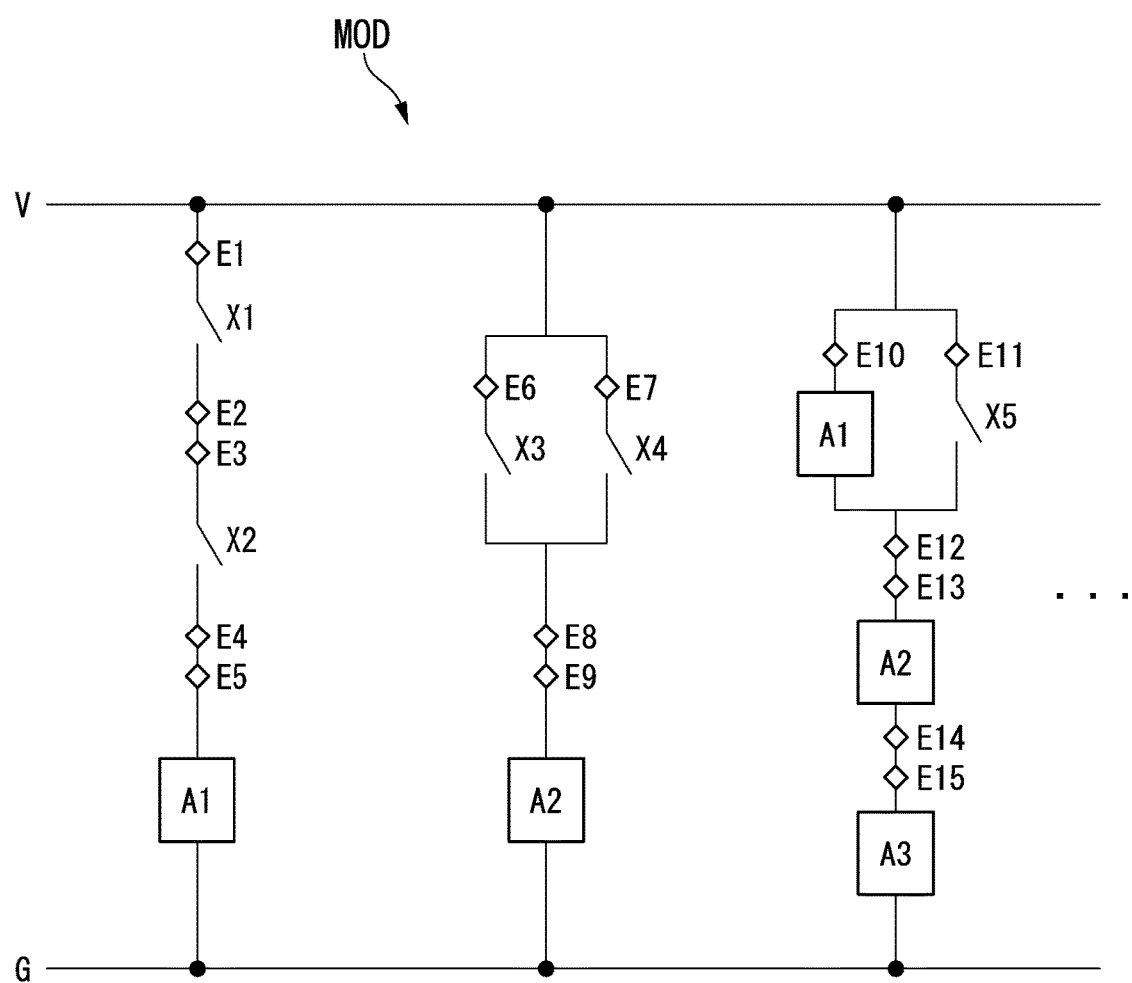
FIG. 3 is a diagram illustrating an example of a model to be inspected according to the first embodiment.

FIG. 3 is a diagram illustrating an example of the model to be inspected according to the first embodiment.

The model to be inspected MOD shown in FIG. 3 simulates the operation logic of the relay circuit constituting the railway security system.

A wiring V and a wiring G shown FIG. 3 are a power supply line and a ground line (ground). Furthermore, elements A1, A2, . . . are relay switches and transition to an OFF state or an ON state in accordance with electrical conduction (0 (FALSE)=OFF/1 (TRUE)=ON). In addition, elements X1, X2, . . . are manual switches and transition to an OFF state or an ON state by a human operation (0=OFF/1=ON).

Elements E1, E2, . . . are virtual elements stipulated for reproducing a defect (disconnection and accidental contact) which can occur in each signal line. For example, the element E1 is stipulated on a signal line connecting the wiring V (power supply line) to the element X1 (manual switch). The element E1 reproduces the "occurrence of disconnection" as one of the defects in the signal line (0=disconnection/1=non-disconnection). Furthermore, the two elements E2 and E3 are stipulated on a signal line connecting the element X1 to the element X2 (manual switch). Of these, the element E2 reproduces the "occurrence of disconnection" in the signal line (0=disconnection/1=non-disconnection) and the element E3 reproduces the "occurrence of accidental contact with the power supply line" in the signal line (0=non-accidental contact/1=accidental contact). Similarly, the two elements E4 and E5 are stipulated on a signal line connecting the element X2 to the element A1 (relay switch). Of these, the element E4 reproduces the "occurrence of disconnection" in the signal line (0=disconnection/1=non-disconnection) and the element E5 reproduces the "occurrence of accidental contact with the power supply line" in the signal line (0-non-accidental contact/1=accidental contact).

An actual model to be inspected MOD is described with a logical expression (language). For example, the element A1 (relay switch) is described as in Expression (1) in consideration of defects (disconnection or accidental contact) which can occur in each signal line in addition the manual switches X1 and X2.

$$A1=(E1\&X1\&E2\&X2\&E4) \text{ or } (E3\&X2\&E4) \text{ or } (E5)) \qquad (1)$$

Other elements are described with the same logical expression.

Expression (1) stipulates the state transition of the element A1 when a defect does not occur in the element A1 (relay switch) itself. In reality, since a defect is also likely to occur in the element A1 itself, the model to be inspected MOD also includes a transition pattern in which the element A1 transitions to an OFF state or an ON state regardless of the logical expression of Expression (1). The same applies to the other elements A2, A3, . . . , and the like.

Also, since the elements X1, X2, . . . which are manual switches are elements of which states transition in accordance with a human operation, in the model inspection, as in the elements E1, E2, . . . which stipulate the occurrence of defects, the elements are stipulated as elements of which states can transition multiple-simultaneously and asynchronously at any timing.

(Processing Flow of Verification Processing Device)

Figure 4:
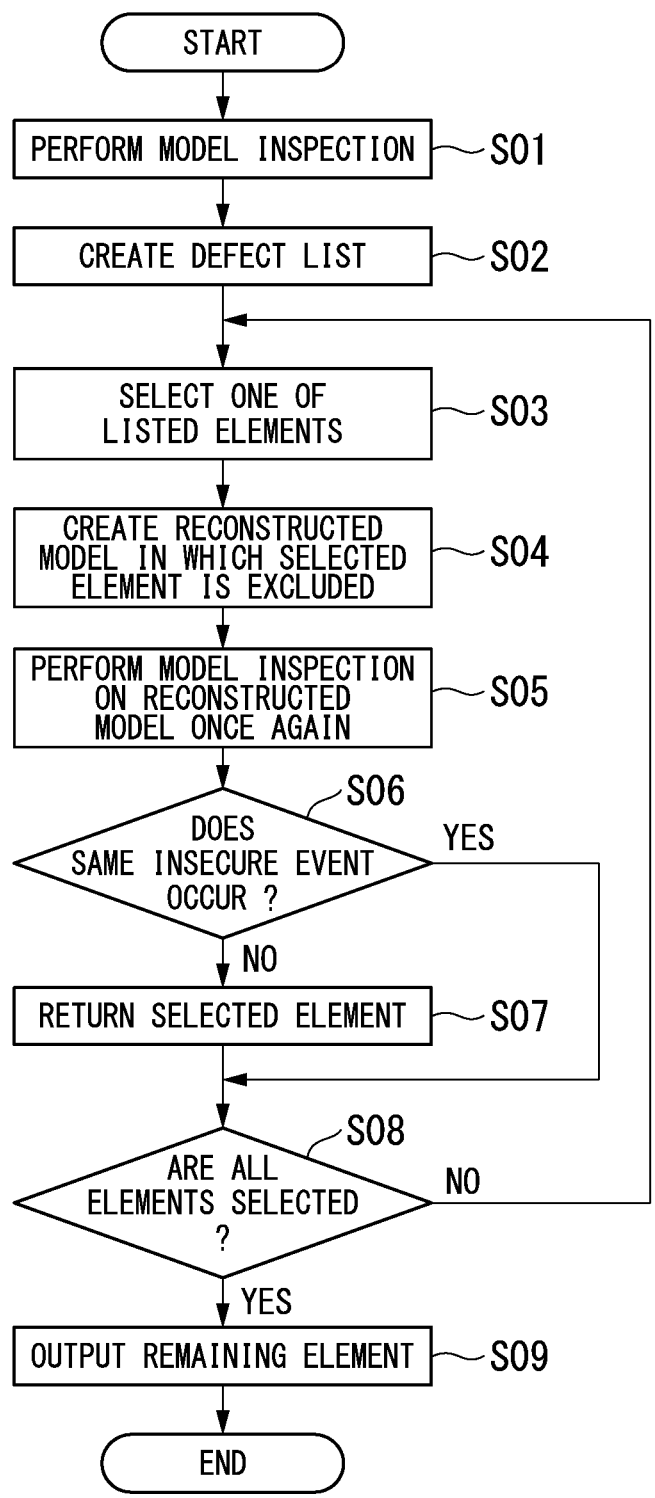
FIG. 4 is a processing flow of the verification processing device according to the first embodiment.

FIG. 4 is a diagram illustrating a processing flow of the verification processing device according to the first embodiment.

Figure 5:
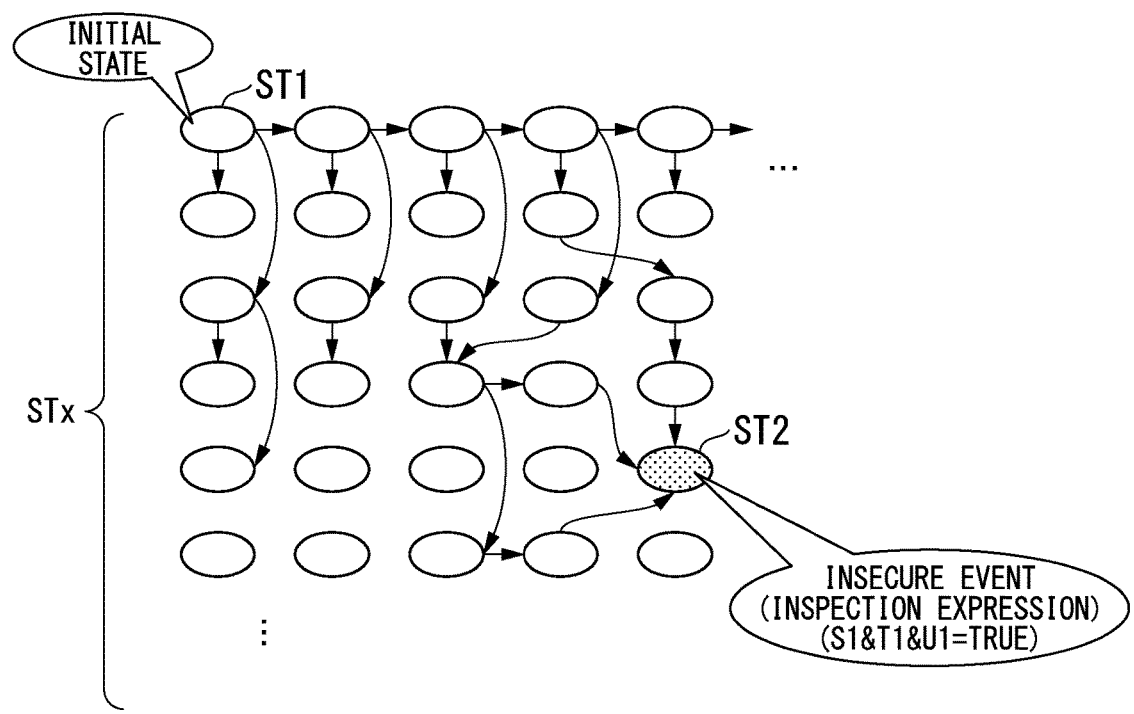
FIG. 5 is a diagram for explaining in detail an operation of the verification processing device according to the first embodiment.
Figure 6:
FIG. 6 is a diagram for explaining in detail an operation of the verification processing device according to the first embodiment.

FIGS. 5 and 6 are diagram for explaining in detail an operation of the verification processing device according to the first embodiment.

The processing flow shown in FIG. 4 shows a flow of a series of processes of model inspection for a model to be inspected MOD, and particularly, shows a flow of processing (processing using the refinement processing unit 103) for further refining elements which contribute to the occurrence of an insecure event (cause elements) from among elements extracted using the inspection processing unit 100.

First, the inspection processing unit 100 of the CPU 10 performs a normal model inspection on a model to be inspected MOD (Step S01). The model inspection performed in Step S01 will be described with reference to a state transition diagram shown in FIG. 5.

A plurality of states STx shown FIG. 5 indicate states of the model to be inspected MOD shown in FIG. 3, respectively. Each state of the model to be inspected MOD is stipulated through a combination of states (0/1) of the elements A1, A2, . . . , X1, X2, . . . , and E1, E2, . . . included in the model to be inspected MOD. Of these, a state ST1 is an initial state of the model to be inspected MOD (that is, a security system). The inspection processing unit 100 comprehensively verifies whether there is a state transition from an insecure event (state ST2) to the initial state (state ST1) in accordance with the logical expression stipulated using the model to be inspected MOD (refer to Expression (1)). The insecure event (state ST2) is stipulated as, for example, a state in which a logical expression (S1&T1&U1=TRUE) for other elements S1, T1, and U1 included in the model to be inspected MOD is included.

When it is verified that there is a path leading from the insecure event (state ST2) to the initial state (state ST1), the inspection processing unit 100 extracts elements in which a defect has occurred in a process leading to an insecure event and creates a defect list (Step S02). FIG. 6 shows an example of the defect list created in Step S02.

When the inspection processing unit 100 meets the insecure event (state ST2) as a result of randomly repeatedly performing a state transition from the initial state (state ST1), the inspection processing unit 100 lists elements of which states change in a process leading to the insecure event (that is, elements which a defect has occurred). Moreover, the inspection processing unit 100 creates a defect list L as shown FIG. 6.

The defect list exemplified in FIG. 6 shows a list of elements in which a state transition has occurred in each transition step from the state ST1 to the state ST2 and includes a value corresponding to an amount of transition of each the elements for each step. For example, the defect list L shown in FIG. 6 shows that an insecure event (inspection expression: S1&T1&U1=TRUE) is reached in a state transition of a sixth step from an initial state. Furthermore, according to the defect list L, it can be read that the element X1 transitions from FALSE to TRUE in a fourth step and transitions from TRUE to FALSE in a fifth step in a process leading to an insecure event.

However, the defect list L shown in Step S02 is merely a list of elements which happen to have state transition in a process leading from the initial state to an insecure event (S1&T1&U1=TRUE) as a result of repeatedly performing a random state transition. Therefore, it is presumed that elements listed in the defect list L include elements which do not directly contribute to the insecure event in a process leading to the insecure event. Thus, the refinement processing unit 103 according to the embodiment further performs the following processes of Steps S03 to S08.

To be specific, the selecting unit 101 (the refinement processing unit 103) of the CPU 10 selects one of the listed elements (Step S03). As a simple example, when the five listed elements (E1, E2, E3, X1, and X2) are present in the defect list L, the selecting unit 101 selects, for example, the element E1 as one of them.

Subsequently, the reconstructing unit 102 (the refinement processing unit 103) of the CPU 10 creates (reconstructs) a model in which the elements selected in Step S03 are excluded from the model to be inspected MOD (Step S04). Hereinafter, the model created in Step S04 is also referred to as a "reconstruction model." For example, when the element E1 is selected in Step S03, the reconstructing unit 102 creates a reconstruction model in which the element E1 is excluded from the original model to be inspected MOD.

Subsequently, the inspection processing unit 100 performs the model inspection once again on the reconstruction model created in Step S0 (Step S05). In the above example, this reconstruction model does not include the element E1. Therefore, in the model inspection performed in Step S05, the "occurrence of disconnection" on a signal line connecting the wiring V (power supply line, refer to FIG. 3) to the element X1 (manual switch, refer to FIG. 3) is not considered.

The inspection processing unit 100 outputs the result of the model inspection performed once again in Step S05 and determines whether the same insecure event (S1&T1&U1=TRUE) as the insecure event which has occurred in the first model inspection (Step S01) occurs (Step S06).

When it is determined that the same insecure event does not occur (Step S06; NO), it can be said that the excluded element is a critical element which contributes to the occurrence of the insecure event because the insecure event no longer occurs as a result of excluding the element selected in Step S03. Therefore, in this case, the reconstructing unit 102 returns the element selected in Step S03 to the model to be inspected MOD (Step S07).

Meanwhile, when it is determined that the same insecure event occurs (Step S06; YES), it can be said that the excluded element, is an element which does not contribute to the occurrence of the insecure event (which is not critical) because the insecure event still occurs even through the element selected in Step S03 is excluded. Since it is preferable that such an element be excluded at the time of counterexample interpretation, the reconstructing unit 102 transitions to the next step without returning the element selected in Step S03 to the model to be inspected MOD.

Subsequently, the selecting unit 101 determines whether all of the elements listed in the defect list L have been selected in Step S02 (Step S08). When it is determined that all of the elements have not been selected (Step S08; NO), the selecting unit returns to the process of Step S03 and selects one element different from those of Step S03 which has been previously performed. Moreover, the reconstructing unit 102 and the inspection processing unit 100 repeatedly perform the processes of Steps S04 to S07.

When it is determined that all of the elements have been selected (Step S08; YES), the selecting unit 101 outputs the remaining elements in the model to be inspected MOD among the elements listed in the defect list L (Step S09).

For example, assuming that the elements (E1, E2, X1) are excluded instead of the critical elements through the processes from Step S03 to Step S08 among the elements (E1, E2, E3, X1, X2) listed in the defect list L in Step S02, the remaining elements after being refined (E3, X2) are output in Step S09.

(Flow of Verification Processing Using Verification Processing Device)

Figure 7:
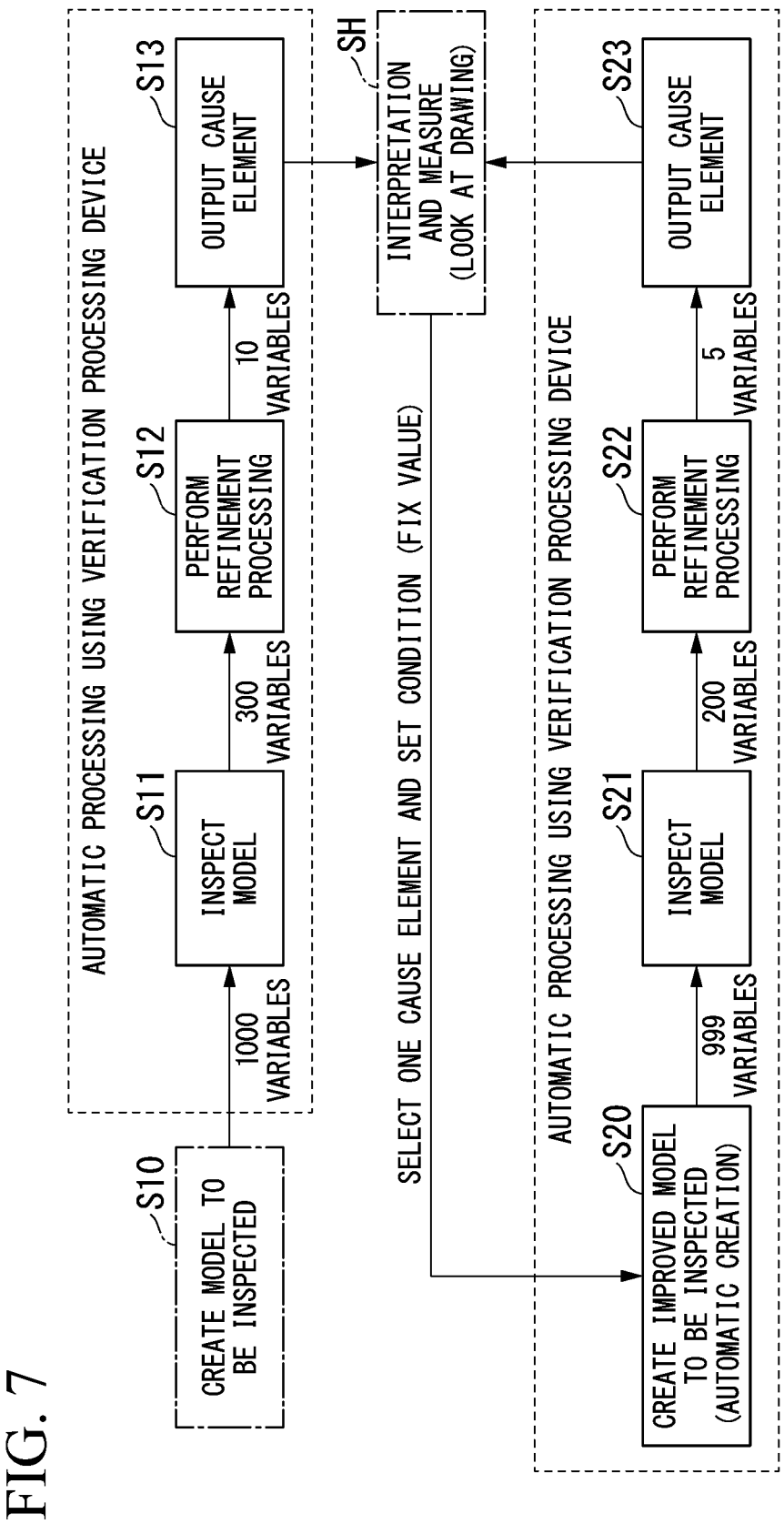
FIG. 7 is a diagram for explaining a flow verification processing using the verification processing device according to the first embodiment.

FIG. 7 is a diagram for explaining a flow of verification processing using the verification processing device according to the first embodiment.

Also, FIGS. 8 to 11 are diagrams showing an example of a display screen displayed on a display of the verification processing device according to the first embodiment.

The flow of the verification processing using the verification processing device 1 according to the first embodiment by an operator will be described below with reference to FIGS. 7 to 11.

First, the operator creates a model to be inspected MC (refer to FIG. 3) of a system to be inspected (railway security system) (Step S10). In this example, it is assumed that the model to be inspected MOD has 1000 elements (variables). The operator inputs the created model to be inspected MOD to the verification processing device 1.

Subsequently, the operator operates the verification processing device 1 to perform a model inspection on the model to be inspected MOD. Here, the CPU 10 (the inspection processing unit 100) of the verification processing device 1 performs a model inspection on the model to be inspected MOD (Step S11). The process of Step S11 using the verification processing device 1 corresponds to the processes of Steps S01 to S02 in FIG. 4. As a result of model inspection, the verification processing device 1 extracts, for example, 300 elements from the 1000 elements (variables) and creates a defect list (refer to FIG. 6). As described above, among the 300 elements, there are also elements which do not actually contribute to the occurrence of insecure events.

The CPU 10 (the refinement processing unit 103) of the verification processing device 1 performs refining processing on the 300 elements extracted through the model inspection (Step S11) (Step S12). The process of Step S12 using the verification processing device 1 corresponds to the process of Steps S03 to S09 in FIG. 4. Through this relining processing, it is assumed that the verification processing device 1 can specifically identifies, for example, 10 cause elements from the 300 elements.

The CPU 10 (the display processing unit 105) of the verification processing device 1 outputs (displays) the 10 cause elements specifically identified via Steps S11 to S12 to the display 12 (Step S13).

An example of the display screen displayed on the display at this stage will be described with reference to FIG. 8.

Figure 8:
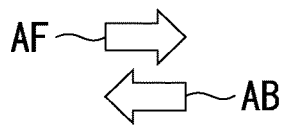
FIG. 8 is a diagram illustrating an example of a display screen displayed on a display of the verification processing device according to the first embodiment.

At this stage, a display screen D as shown in FIG. 8 is displayed on the display 12.

As shown in FIG. 8, a number "1" indicating a cause element specifically identified through a first model inspection and refining processing is provided in the column "step" on the display screen D. 10 refined cause elements (E1, E3, . . . ) are displayed in the column "Cause element" on the display screen D of the "step1" row.

Also, a check box CB1, a measure button AF, a return button AB, and an execute button E are displayed on the display screen D1. These check boxes and various buttons will be described later.

Referring to FIG. 7 again, subsequently the operator interprets the displayed 10 cause elements while confirming a circuit diagram or the like and examines a measure (Step SH). Moreover, the operator selects one of the cause elements for which the measure is to be taken and inputs the selected cause element to the verification processing device 1. The CPU 10 (the receiving unit 104) of the verification processing device 1 receives an input from the operator.

Figure 9:
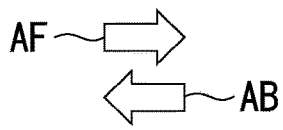
FIG. 9 is a diagram illustrating an example of the display screen displayed on the display of the verification processing device according to the first embodiment.

An example of the display screen displayed on the display 12 at this stage will be described with reference to FIG. 9.

The operator checks a check box CB1 of a cause element (for example, element E1) for which a measure is to be taken to make the check effective. Subsequently, the operator clicks a measure button AF. Thus, the cause element (element E1) for which the check is made effective is displayed in the column "Measure" of the "step1" row. The cause element displayed in this column is treated as a fixed value (element in which a defect does not occur) in the next model inspection assuming that an appropriate measure has been taken. In the embodiment, the element displayed in this column is treated as, for example, a fixed value fixed to TRUE.

When the cause element displayed in the column "Measure" is to be excluded from the same column, the operator may make a cheek box of the element E1 displayed in the column "Measure" effective and click a return button AB.

Also, although the operator selects only one cause element (element E1) in the above example, here, the operator may select two or more cause element.

Subsequently, the operator fills measure details to be actually taken for the element E1 (for example, "adding a ∘∘ element to make redundancy," "changing a ∘∘ element to a xx element," or the like) in the column "Comment" in the "step1" row. This column can be freely filled in a text format by the operator.

If the cause element has been selected and the column "Comment" has been filled, the operator clicks the execute button E.

Referring to FIG. 7 again, a process after the operator has clicked the execute button E will be described.

The CPU 10 (the reconstructing unit 102) of the verification processing device 1 automatically creates an improved model to be inspected on the basis of the model to be inspected MOD which has been first input (Step S20). To be specific, this improved model to be inspected is a model to be inspected which imitates an operation of a system on which it is assumed that appropriate measures have been taken for the cause element (element E1) selected by the operator in Step SH. That is to say, in this example, the improved model to be inspected is a model to be inspected in which the element E1 which is the cause element selected by the operator is treated as a fixed value which is TRUE. The improved model to be inspected includes 999 elements in which the element E1 which is regarded as a fixed value is excluded.

Subsequently, the CPU 10 (the inspection processing unit 100) of the verification processing device 1 performs a model inspection for the improved model to be inspected created in Step S20 (Step S21). In the improved model to be inspected, the element E1 is a fixed value which is TRUE. Thus, a path in which the element E1 transitions from TRUE to FALSE is not verified through this model inspection. When this element E1 is a major cause of insecure events, the number of elements extracted in a second model inspection may be significantly reduced in some cases. Here, although the path (counterexample) leading to the insecure event is still found as a result of the model inspection, it is assumed that the number of elements extracted through the model inspection can be reduced to 200.

Also, the CPU 10 (the refinement processing unit 103) of the verification processing device 1 performs the same refining processing as in Step S12 on 200 elements extracted through the model inspection (Step S21) (Step S22). It is assumed that the verification processing device 1 can specifically identify five cause elements from the 200 elements through this refining processing.)

The CPU 10 (the display processing unit 105) of the verification processing device 1 outputs (displays) the five cause elements specifically identified through Steps S20 to S22 to the display 12 (Step S23).

An example of the display screen displayed on the display 12 at this stage will be described with reference to FIG. 10.

Figure 10:
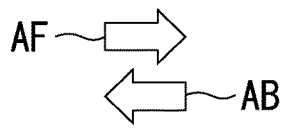
FIG. 10 is a diagram illustrating an example of the display screen displayed on the display of the verification processing device according to the first embodiment.

At this stage, a display screen D as shown FIG. 10 is displayed on the display 12.

As shown in FIG. 10, FALSE indicating that there was a counterexample which has reached an insecure event is displayed in the column "Result" of "step1."

Also, a new "step2" row is created. Five cause elements (E4, E5, . . . ) specifically identified through the process of Steps S21 and S22 are displayed in the column "Cause element" of the "step2" row.

Referring to FIG. 7 again, the operator interprets the displayed five cause elements once again while confirming a circuit diagram or the like and examines measures (Step SH). Moreover, the operator selects one of the cause elements for which measures are to be taken and inputs the selected cause element to the verification processing device 1. The CPU 10 (the receiving unit 104) of the verification processing device 1 receives an input from the operator.

Figure 11:
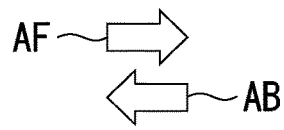
FIG. 11 is a diagram illustrating an example of the display screen of the display of the verification processing device according to the first embodiment.

An example of the display screen displayed on the display 12 at this stage will be described with reference to FIG. 11.

In the "step2" row, the operator clicks the check box CB1 of the cause element (for example, element, E4) for which measures are to be further taken to make the check effective. Subsequently, the operator clicks the measure button AF. Thus, the checked cause element (element E4) is displayed in the column "Measure" of the "step2" row. As in the element E1 of the "step1" row, it is assumed that the element E4 displayed in this column is treated as a fixed value fixed to TRUE.

Subsequently, the operator fills the details of the measure to be actually taken for the element E4 in the column "Comment" of the "step2" row.

If the cause element has been selected and the column "Comment" has been filled, the operator clicks the execute button E.

If the execute button E is clicked, the processes of Steps S20 to S23 of FIG. 7 are performed again on the improved model to be inspected in which the element E4 is further treated as a fixed value.

As a result of this processing, when a path (counterexample) leading to an insecure event is not found, TRUE is displayed in the column "Result" of the "step2" row. When a path (counterexample) leading to an insecure event is found, a "step3" row is added and a newly specifically identified cause element is displayed in the column "Cause element," In this way, the display 12 displays a history of a cause element (element which is a target of a measure) selected in each step and the details of the measure.

The operator repeatedly performs the process of Step SH and Steps S20 to S23 until there is no counterexample.

The verification processing device 1 outputs a measure list which is a list showing cause elements (elements which are targets for measures) selected in each step and measure details thereof (text in the column "Comment") in accordance with an operator's operation.

(Action and Effect)

According to the above constitution, the verification processing device 1 receives, from the operator, the selection of at least one cause element from the cause elements specifically identified through the model inspection and the refining processing, automatically generates a new model to be inspected (improved model to be inspected) in which a prescribed measure is executed for the selected cause element, and performs a model inspection once again on the improved model to be inspected.

Thus, it is possible to automate a process of repeatedly performing "cause investigation (interpretation, measures) by humans→resetting/coding of model to be inspected→execution of model inspection again." Therefore, it is possible to minimize the occurrence of a human error while shortening the working time.

Also, the verification processing device 1 according to the first embodiment displays the column "Comment" so that the verification processing device 1 can receive an input of the details of the measure to be taken for the cause element selected as a target of the measure.

Thus, it is possible to associate and record the specific details to be taken as measures for the elements of the actual system.

Furthermore, the verification processing device 1 according to the first embodiment displays the cause element selected by the operator and the history of the result of the model inspection performed once again through the display screen D (FIGS. 8 to 11).

Thus, in the process of repeatedly performing the model inspection, the operator can perform verification while looking back on any measures which have been taken for any elements.

Modified Example of First Embodiment

Although the verification processing device 1 according to the first embodiment has been described in detail above, the specific embodiment of the verification processing device 1 is not limited to the above and various design changes and the like can be added without departing the gist of the present invention.

Although the cause element displayed in the column "Measure" of the display screen D (FIGS. 8 to 11) has been described as being treated as a fixed value which is TRUE in the first embodiment, other embodiments are not limited to this embodiment. For example, the display screen D of the verification processing device 1 according to another embodiment may include the columns "Measure 1" and "Measure 2," the cause element displayed in the column "Measure 1" may be treated as a fixed value which is TRUE, and the cause element displayed in the column "Measure 2" may be treated as a fixed value which is FALSE.

Also, the verification processing device 1 according to another embodiment may allow the operator to set more complicated conditions (for example, "element E1 and element E3 do not become TRUE at the same time"). In this case, the reconstructing unit 102 automatically creates an improved model to be inspected which satisfies the above conditions set by the operator.

Furthermore, the verification processing device 1 according to the modified example of the first embodiment may further have a function (reporting processing unit) for automatically reporting an operation history.

That is to say, the reporting processing unit creates a report including the following information on the basis of a series of verifications shown in FIG. 7:

(1) combinations of cause elements extracted in each step (information in the column "Cause element" in FIGS. 8 to 11);

(2) measure proposals for (1) (selected exclusion devices, information about the column "Measure" in FIGS. 8 to 11), reasons therefor (information about the column "Comment" in FIGS. 8 to 11), and inspection results (information about the column "Result" in FIGS. 8 to 11);

(3) a total of variable used in this verification; and (4) a list obtained by collecting the results before the measure is taken and the measure state for each inspection expression.

When the reporting function (reporting processing unit) as described above is provided, an evidence is easily managed.

Second Embodiment

A verification processing device according to a second embodiment will be described below with reference to FIGS. 12 and 13.

(Flow of Verification Processing Using Verification Processing Device)

Figure 12:
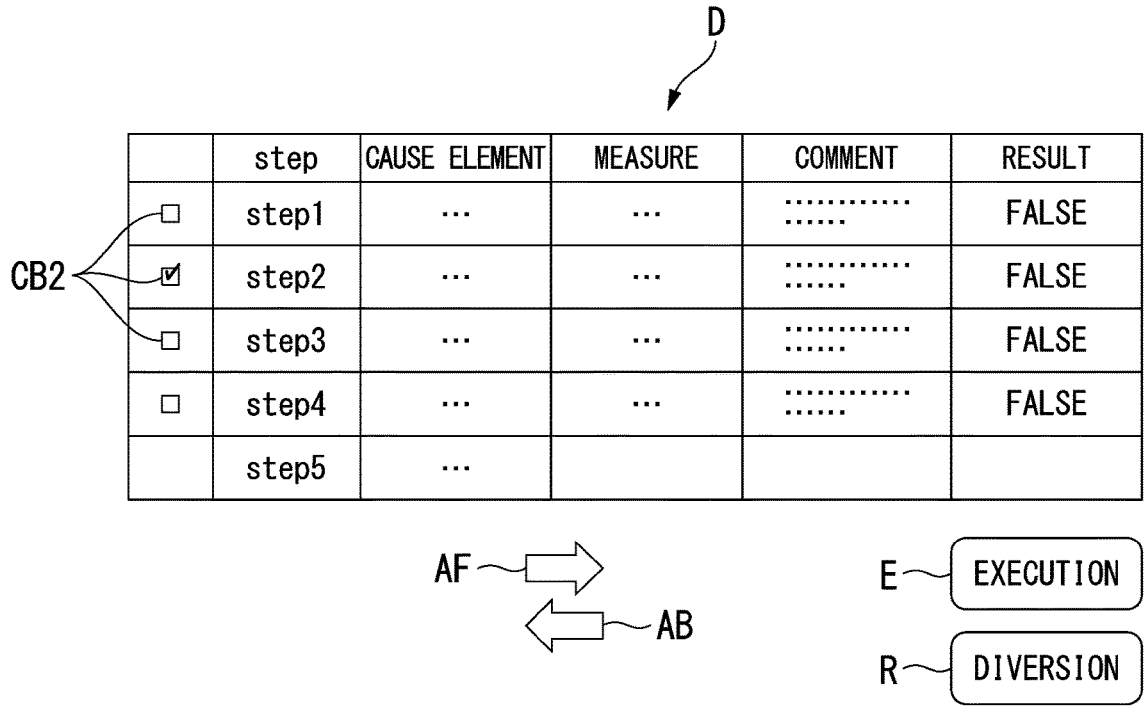
FIG. 12 is a diagram illustrating an example of a display screen of a display of a verification processing device according to a second embodiment.
Figure 13:
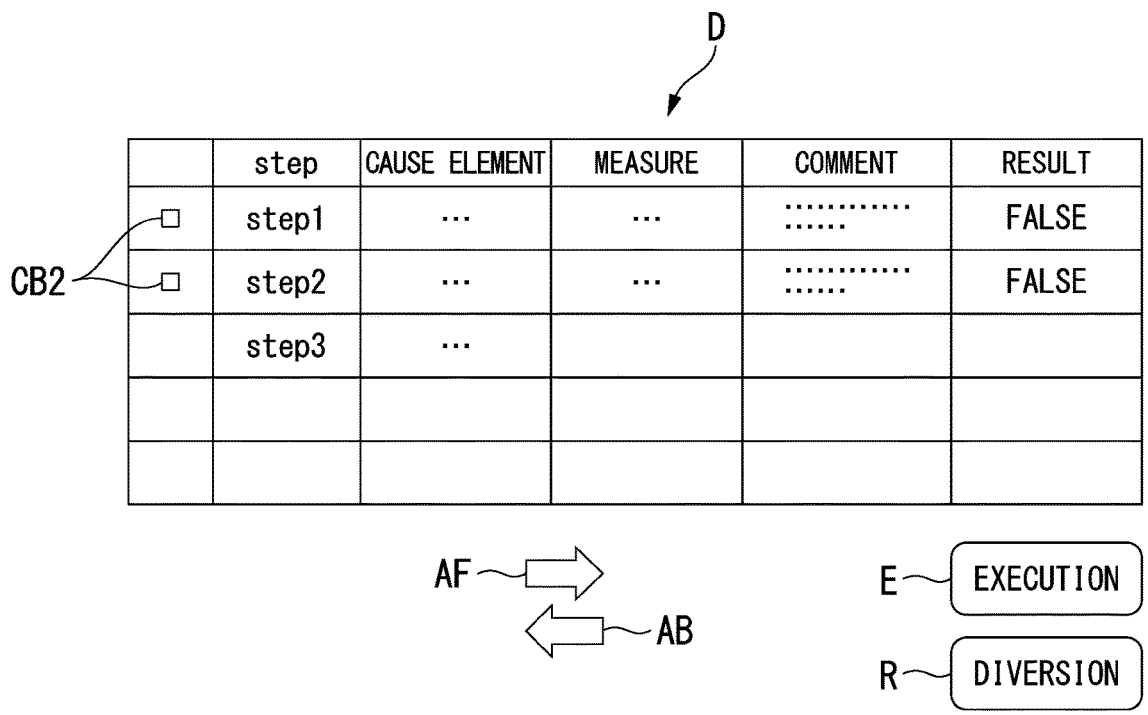
FIG. 13 is a diagram illustrating an example of the display screen of the display of the verification processing device according to the second embodiment.

FIGS. 12 and 13 are diagrams showing an example of a display screen displayed on a display of the verification processing device according to the second embodiment.

A display screen D as shown in FIGS. 12 and 13 is displayed on a display 12 of a verification processing device 1 according to the second embodiment. To be specific, a check box CB2 is provided in the display screen D to correspond to each step. Furthermore, a diversion button R is displayed on the display screen D.

The display screen D shown in FIG. 12 shows an example in which a verification for a model to be inspected MOD has reached "step4."

Here, the operator needs to take any measure for any element or to repeatedly perform trial and error to find an effective measure. In such trial and error, there are cases in which it is desired to divert the results of implementing measures on the way. In this example, it is conceivable that the operator wants to perform a verification again from "step2" as a result of trial and error. In this case, as shown in FIG. 12, the operator clicks the check box CB2 in the "step2" row to make the check effective and clicks the diversion button R.

In this case, the verification processing device 1 records and outputs (reports) the verification results (results up to "step4") completed so far and includes the results up to "step2" reflected therein for the original model to be inspected MOD (refer to FIG. 13). Moreover, the verification processing device 1 waits for the selection of the cause element performed once again by the operator in "step3" subsequent to "step2."

(Action and Effect)

According to the above constitution, the verification processing device 1 can go back arbitrary stage (step) in the history and receive the selection of the cause element once again. Thus, since the rework which occurs during trial and error can be minimized, it is possible to shorten the time required for deriving measures which satisfy insecure events (inspection expressions) and improve work efficiency.

Third Embodiment

A verification processing device according to a third embodiment will described below with reference to FIGS. 14 and 15.

(Constitution of Verification Processing Device)

Figure 14:
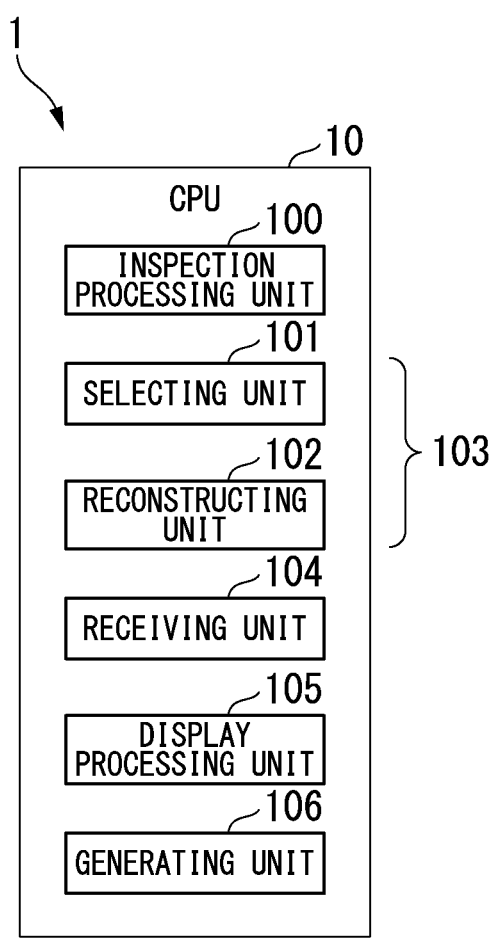
FIG. 14 is a diagram illustrating a functional constitution of a CPU of a verification processing device according to a third embodiment.

FIG. 14 is a diagram showing a functional constitution of a CPU of the verification processing device according to the third embodiment.

A verification processing device 1 according to the third embodiment and the verification processing device 1 according to the first and second embodiments differ in that the verification processing device 1 according to the third embodiment has a function as a generating unit 106.

The generating unit 106 generates a measure list showing a list of cause elements selected until there is no insecure event in a model inspection and a refining process repeatedly performed on a certain model to be inspected.

Also, the inspection processing unit 100 according to the third embodiment performs a model inspection on other models to be inspected for improved model to be inspected to which prescribed measures have been executed for all of the cause elements shown in the measure list.

(Flow of Verification Processing Using Verification Processing Device)

Figure 15:
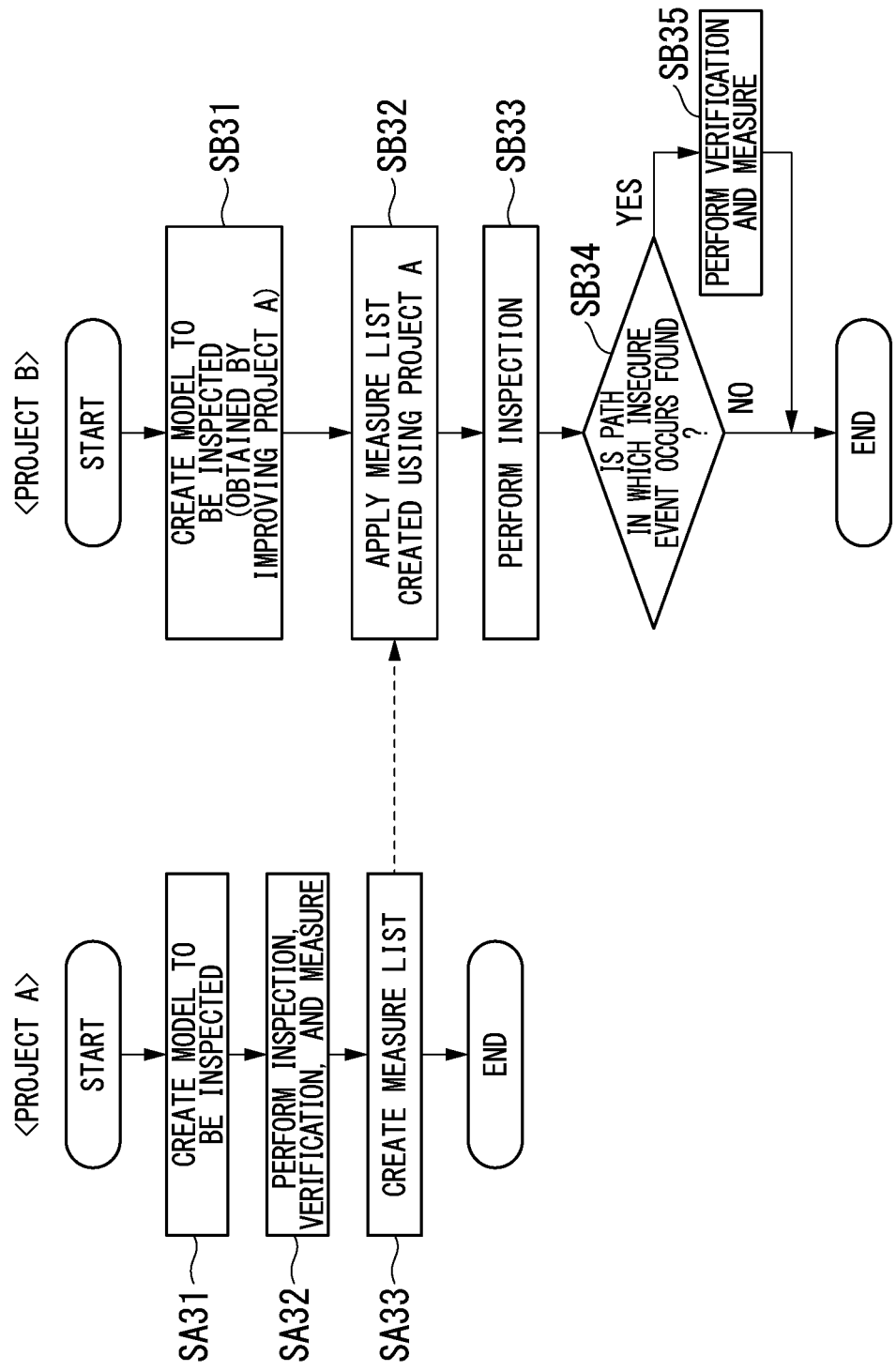
FIG. 15 is a diagram for explaining a flow of verification processing using the verification processing device according to the third embodiment.

FIG. 15 is a diagram for explaining a flow of verification processing using the verification processing device according to the third embodiment.

FIG. 15 shows a flow in which a model to be inspected of a system of Project A is first verified, and then a measure list in which the measures are recorded is used for the verification of a model to be inspected of Project B.

To be specific, first, the operator creates a model to be inspected of the system of Project A (Step SA31).

Subsequently, the operator repeatedly performs a model inspection (and refining processing), interpretation, and measure processing (Steps S20 to S23 and Step SH in FIG. 7) on the model to be inspected until there is no counterexample (Step SA32).

When there is no counterexample, the CPU 10 (the generating unit 106) of the verification processing device 1 creates a measure list for the model to be inspected of the system of Project A (Step SA33). The measure list is a list in which a list of the cause elements selected by the operator and the pleasure details therefor (description details of the column "Measure" and the column "Comment" of each step in the display screen D (FIGS. 8 to 11)) is recorded until a path leading to an insecure event is not found.

Subsequently, in Project B, it is examined to improve the system of Project A (for example, adding a new function to the system of Project A). The operator creates a model to be inspected of the system of Project B (Step SB31).

Subsequently, the operator applies (imports) a measure list created for the system of Project A (Step SB32). Thus, the CPU 10 (the reconstructing unit 102) of the verification processing device 1 creates an improved model to be inspected in which all of the cause elements shown in the measure list are treated as fixed values on the basis of the model to be inspected of the system of Project B.

The verification processing device 1 performs a model inspection on the improved model to be inspected (Step SB33) and determines whether a path in which an insecure event occurs is found as a result of the model inspection (Step SB34).

When it is determined that a path in which an insecure event occurs is not found (Step SB34), it can be determined that the measures taken for the system of Project A are sufficient for the system of Project B. Therefore, the operator finishes the process performed on the system of Project B without performing the processes of interpretation and measures.

On the other hand, when it is determined that a path in which an insecure event occurs is found (Step SB34), it can be determined that the system of Project B is not sufficient only by the measures taken for the system of Project A. Thus, the operator performs the process of FIG. 7 again on the system of Project B, performs a verification, and takes measures (Step SB35).

(Action and Effect)

In a system associated with a certain project, it is assumed that a measure proposal in which a counterexample (insecure event) does not occur through repeatedly performing "counterexample interpretation→model resetting→model inspection execution→ . . . " can be provided. In this case, when a new system (system of Project B) obtained by applying an improvement or a design change to the system of Project A is verified, a verification concerning whether the measures taken for the original system are useful or the measures taken for the original system are not useful may be desired to be performed in some cases.

In the related art, when an improvement or a design change has been performed on a certain system, the variables of the changed parts are different. Thus, it takes a lot of time to perform a verification because the measure proposals in the related art (measure list) cannot be diverted.

According to the verification processing device 1 associated with the third embodiment, when the measure list created at the time of the verification of the system of Project A described above is imported, it is possible to reduce the time and effort required for verifying the system of Project B (improved version). Thus, it is possible to check the usefulness of measures and the overlookings of measures after the improvement is applied in a short time.

Other Modified Examples

In the first to third embodiments described above, the processes of the various processing of the CPU 10 described above are stored in a computer-readable recording medium in the form of a program and the various processing is performed by the computer configured to read and execute this program. Furthermore, the computer-readable recording medium refers to a magnetic disk, a magneto-optical disk, a CD-ROM, a DVD-ROM, a semiconductor memory, or the like. In addition, this computer program may be distributed to a computer via a communication line and the computer receiving the distribution may execute the program.

The above program may be for realizing a part of the above-described functions. Furthermore, a so-called difference file (difference program) may be used which can realize the above-described functions in combination with a program already recorded in a computer system.

Although some embodiments according to the present disclosure have been described as described above, all of these embodiments are presented as examples and are not intended to limit the scope of the invention. These embodiments can be implemented in various other embodiments and various omissions, replacements, and changes are possible without departing from the gist of the invention. These embodiments and modifications thereof are included in the scope of the invention described in the claims and the equivalent scope thereof, as are included in the scope and the gist of the invention.

<Supplementary Note>

A verification processing device 1, an update processing method, and a program described in each embodiment are ascertained, for example, as follows.

(1) A verification processing device 1 according to a first aspect includes: an inspection processing unit 100 which extracts elements of which states change in a process leading to an insecure event by means of a model inspection for a model to be inspected MOD; a refinement processing unit 103 which determines, for each of the extracted elements, whether the element contributes to the occurrence of the insecure event and refines a cause element which is an element of the cause of the insecure event; and a receiving unit 104 which receives, from an operator, a selection of at least one cause element from among a plurality of the cause elements. The inspection processing unit 100 performs the model inspection once again on an improved model to be inspected which is a new model to be inspected in which a prescribed measure is executed for the selected cause element.

(2) A verification processing device 1 according to a second aspect is the verification processing device in (1) and the receiving unit 104 further receives an input of the details of the measure to be taken for the selected cause element.

(3) A verification processing device 1 according to a third aspect is the verification processing device of (1) or (2) and further includes a display processing unit 105 which displays a history of the results of the selected cause element and the model inspection performed once again.

(4) A verification processing device 1 according to a fourth aspect is the verification processing device of (3) and the receiving unit 104 can return to an arbitrary stage in the history and receive a selection of the cause element once again.

(5) A verification processing device 1 according to a fifth aspect is the verification processing device of any one of (1) to (4) and further includes a generating unit 106 which generates a measure list showing a list of cause elements selected until there is no insecure event in the model inspection performed once again of a first model to be inspected. The inspection processing unit 100 performs a model inspection on a second model to be inspected for the improved model to be inspected to which a prescribed measure has been executed for all the cause elements shown in the measure list.

(6) A verification method according to a sixth aspect includes: a step of extracting elements of which states change in a process leading to an insecure event by means of a model inspection for a model to be inspected; a step of determining, for each of the extracted elements, whether the element contributes to the occurrence of the insecure event and refining a cause element which is an element of the cause of the insecure event; a step of receiving, from an operator, a selection of at least one cause element from among a plurality of the cause elements; and a step of performing the model inspection once again on an improved model to be inspected which is a new model to be inspected in which a prescribed measure is executed for the selected cause element.

(7) A program according to a seventh aspect causes a computer of a verification processing device 1 to execute: a step of extracting elements of which states change in a process leading to an insecure event by means of a model inspection for a model to be inspected; a step of determining, for each of the extracted elements, whether the element contributes to the occurrence of the insecure event and refining a cause element which is an element of the cause of the insecure event; a step of receiving, from an operator, a selection of at least one cause element from among a plurality of the cause elements; and a step of performing the model inspection once again on an improved model to be inspected which is a new model to be inspected in which a prescribed measure is executed for the selected cause element.

INDUSTRIAL APPLICABILITY

According to the verification processing device, the update processing method, and the program described above, it is possible to minimize a human error while shortening a working time.

REFERENCE SIGNS LIST

1 Verification processing device
10 CPU
100 Inspection processing unit
101 Selecting unit
102 Reconstructing unit
103 Refinement processing unit
104 Receiving unit
105 Display processing unit
106 Generating unit
11 Memory
12 Display
13 Input device
14 Storage
MOD Model to be inspected
L Defect list

The invention claimed is:

1. A verification processing device, comprising:
   an inspection processing unit which extracts elements of which states change in a process leading to an insecure event by means of a model inspection for a model to be inspected;
   a refinement processing unit which determines, for each of the extracted elements, whether the element contributes to the occurrence of the insecure event and refines a cause element which is an element of a cause of the insecure event; and
   a receiving unit which receives, from an operator, a selection of at least one cause element from among a plurality of the cause elements
   wherein the inspection processing unit performs the model inspection once again on an improved model to be inspected which is a new model to be inspected in which a prescribed measure is executed for the selected cause element.

2. The verification processing device according to claim 1, wherein the receiving unit further receives an input of details of the measure to be taken for the selected cause element.

3. The verification processing device according to claim 2, further comprising:
   a display processing unit which displays a history of the selected cause element and results of the model inspection performed once again.

4. The verification processing device according to claim 3, wherein the receiving unit is able to return to an arbitrary stage in the history and receive a selection of the cause element once again.

5. The verification processing device according to claim 4, further comprising:
   a generating unit which generates a measure list showing a list of cause elements selected until there is no insecure event in the model inspection performed once again of a first model to be inspected,
   wherein the inspection processing unit performs a model inspection on a second model to be inspected for the improved model to be inspected to which a prescribed measure has been executed for all the cause elements shown in the measure list.

6. The verification processing device according to claim 3, further comprising:
   a generating unit which generates a measure list showing a list of cause elements selected until there is no insecure event in the model inspection performed once again of a first model to be inspected,
   wherein the inspection processing unit performs a model inspection on a second model to be inspected for the improved model to be inspected to which a prescribed measure has been executed for all the cause elements shown in the measure list.

7. The verification processing device according to claim 2, further comprising:
   a generating unit which generates a measure list showing a list of cause elements selected until there is no insecure event in the model inspection performed once again of a first model to be inspected,
   wherein the inspection processing unit performs a model inspection on a second model to be inspected for the improved model to be inspected to which a prescribed measure has been executed for all the cause elements shown in the measure list.

8. The verification processing device according to claim 1, further comprising:
   a display processing unit which displays a history of the selected cause element and results of the model inspection performed once again.

9. The verification processing device according to claim 8, wherein the receiving unit is able to return to an arbitrary stage in the history and receive a selection of the cause element once again.

10. The verification processing device according to claim 9, further comprising:
    a generating unit which generates a measure list showing a list of cause elements selected until there is no insecure event in the model inspection performed once again of a first model to be inspected,
    wherein the inspection processing unit performs a model inspection on a second model to be inspected for the improved model to be inspected to which a prescribed measure has been executed for all the cause elements shown in the measure list.

11. The verification processing device according to claim 8, further comprising:
    a generating unit which generates a measure list showing a list of cause elements selected until there is no insecure event in the model inspection performed once again of a first model to be inspected,
    wherein the inspection processing unit performs a model inspection on a second model to be inspected for the improved model to be inspected to which a prescribed measure has been executed for all the cause elements shown in the measure list.

12. The verification processing device according to claim 1, further comprising:
    a generating unit which generates a measure list showing a list of cause elements selected until there is no insecure event in the model inspection performed once again of a first model to be inspected,
    wherein the inspection processing unit performs a model inspection on a second model to be inspected for the improved model to be inspected to which a prescribed measure has been executed for all the cause elements shown in the measure list.

13. A verification method, comprising:
    a step of extracting elements of which states change in a process leading to an insecure event by means of a model inspection for a model to be inspected;
    a step of determining, for each of the extracted elements, whether the element contributes to the occurrence of the insecure event and refining a cause element which is an element of a cause of the insecure event;
    a step of receiving, from an operator, a selection of at least one cause element from among a plurality of the cause elements; and
    a step of performing the model inspection once again on an improved model to be inspected which is a new model to be inspected in which a prescribed measure is executed for the selected cause element.

14. A non-transitory computer-readable recording medium storing a program causing a computer of a verification processing device to execute:
    a step of extracting elements of which states change in a process leading to an insecure event by means of a model inspection for a model to be inspected;
    a step of determining, for each of the extracted elements, whether the element contributes to the occurrence of the insecure event and refining a cause element which is an element of a cause of the insecure event;

a step of receiving, from an operator, a selection of at least one cause element from among a plurality of the cause elements; and a step of performing the model inspection once again on an improved model to be inspected which is a new model to be inspected in which a prescribed measure is executed for the selected cause element.

\* \* \* \* \*